United States Patent [19]

Bender

[11] 4,162,855

[45] Jul. 31, 1979

[54] MAGNETIC STIRRER APPARATUS

[75] Inventor: Charles E. Bender, Fairfield, Pa.

[73] Assignee: Spectroderm International, Inc., Fairfax, Va.

[21] Appl. No.: 774,422

[22] Filed: Mar. 4, 1977

Related U.S. Application Data

[63] Continuation-in-part of Ser. No. 622,013, Oct. 10, 1975, abandoned, which is a continuation-in-part of Ser. No. 524,788, Nov. 18, 1974, abandoned.

[51] Int. Cl.² .................................................. B01F 13/08
[52] U.S. Cl. ....................................... 366/274; 366/317
[58] Field of Search .................... 259/8, 16, 23, 24, 33, 259/43, 44, 66, 67, 108, 107, DIG. 46; 215/DIG. 8; 416/3, 142; 366/273, 274, 315

[56] References Cited

U.S. PATENT DOCUMENTS

| | | | |
|---|---|---|---|
| 2,549,121 | 4/1951 | Osterheld | 259/DIG. 46 |
| 2,859,020 | 11/1958 | Eddy et al. | 259/DIG. 46 |
| 2,951,689 | 9/1960 | Asp et al. | 416/3 |
| 2,958,517 | 11/1960 | Harker et al. | 259/108 |
| 3,116,913 | 1/1964 | Lane | 259/108 |

Primary Examiner—Harvey C. Hornsby
Assistant Examiner—Timothy F. Simone
Attorney, Agent, or Firm—George R. Douglas, Jr.; Sherman Levy

[57] ABSTRACT

A lightweight magnetic stirrer apparatus which may be positioned for rotation in a fluid containing vessel, having a magnetic rotor assembly including a generally vertical center hub on which is mounted a generally horizontal magnetic impeller. The rotor assembly is rotatably mounted in a positioning cage which generally positions the rotor assembly within the vessel and prevents it from contacting the walls of the vessel to allow the rotor assembly hub to rotate free relative to the vessel in the cage under the influence of an exterior magnetic drive. The magnetic stirrer apparatus is also provided with a cage in which the legs are totally removeable so as to make it any size for different beakers. Furthermore, the magnet may be removed completely from the cage so that it may be dropped into the neck of a bottle and the magnet per se used by itself. High lubricity bearing surfaces of the hub and cage reduce frictional forces and allow rotation of the impeller at very low speeds.

2 Claims, 13 Drawing Figures

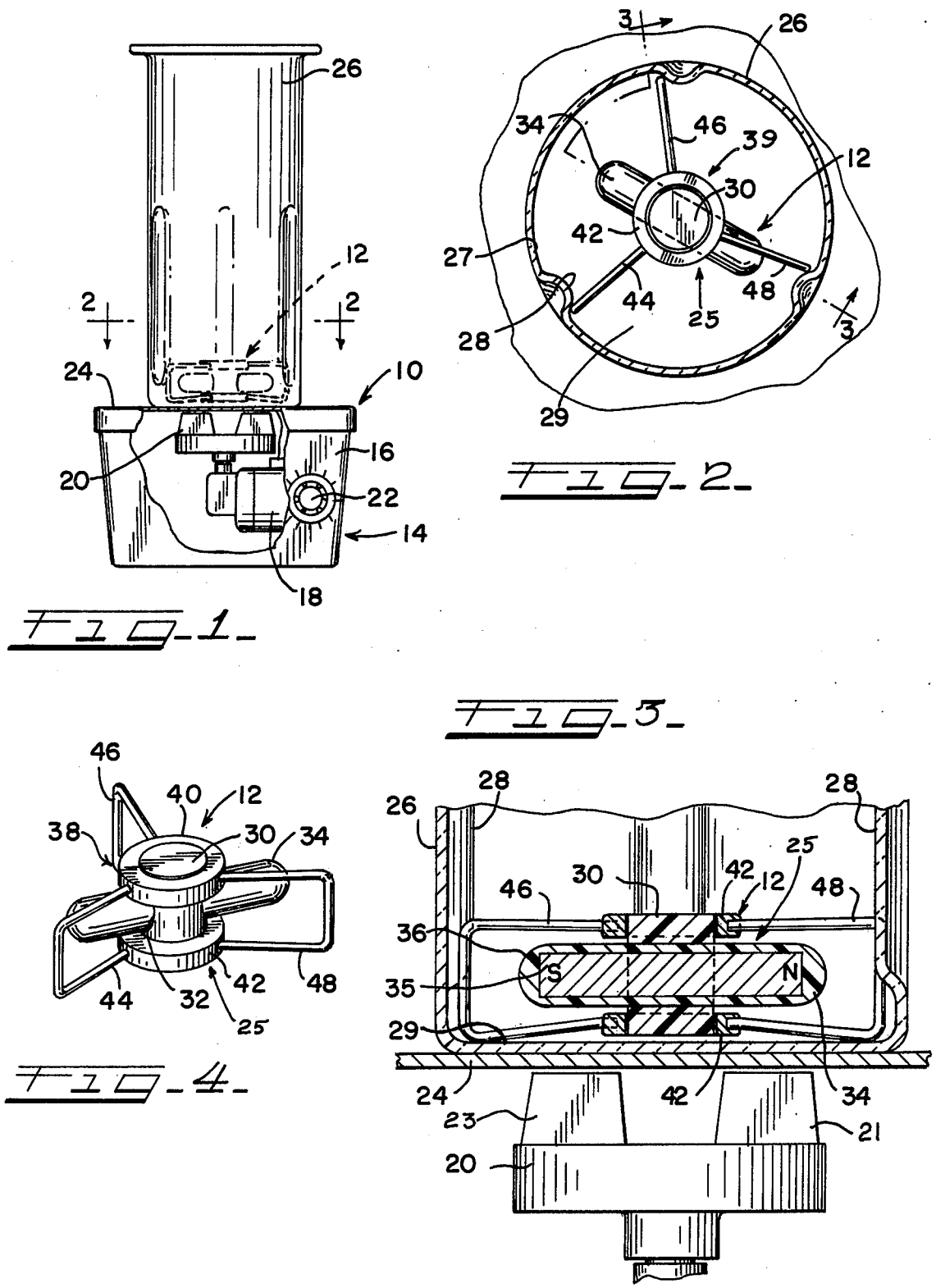

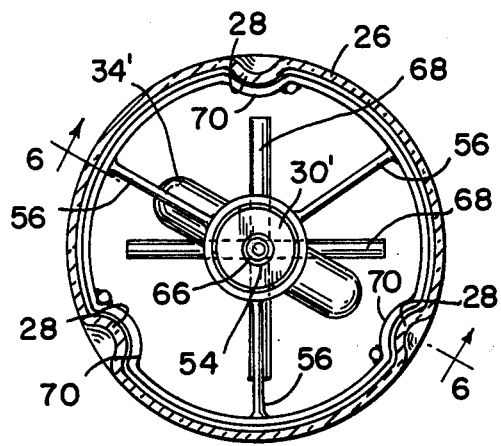
FIG_6_
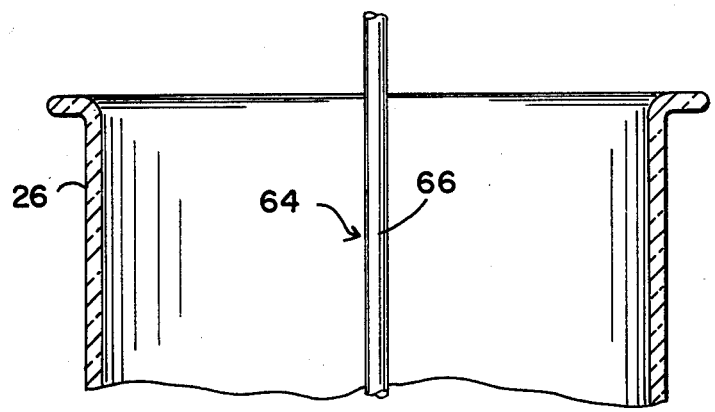
FIG_5_
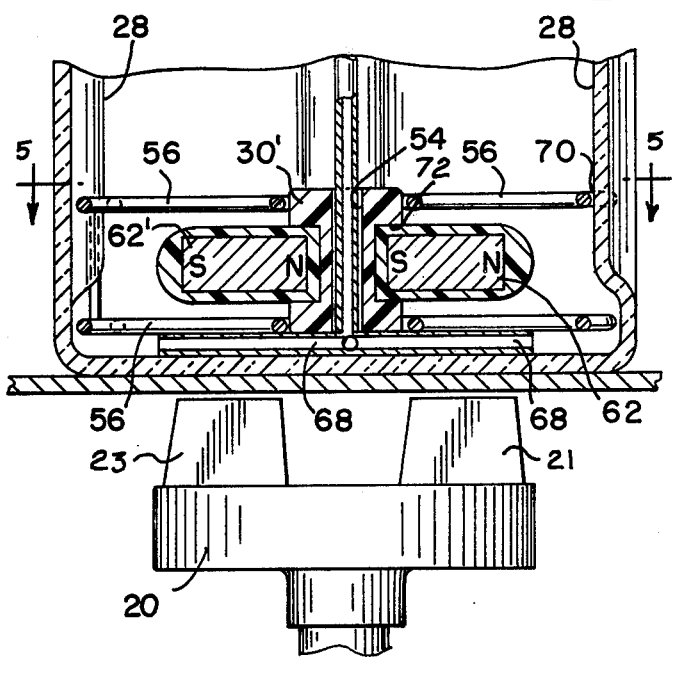
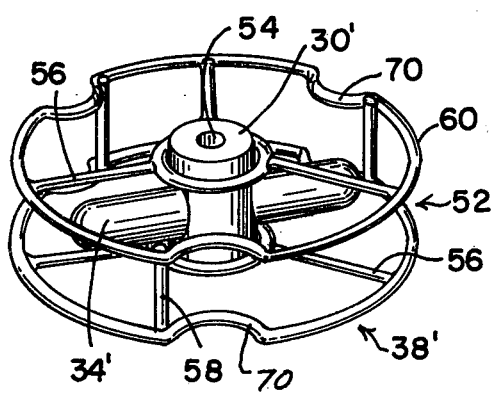
FIG_7_

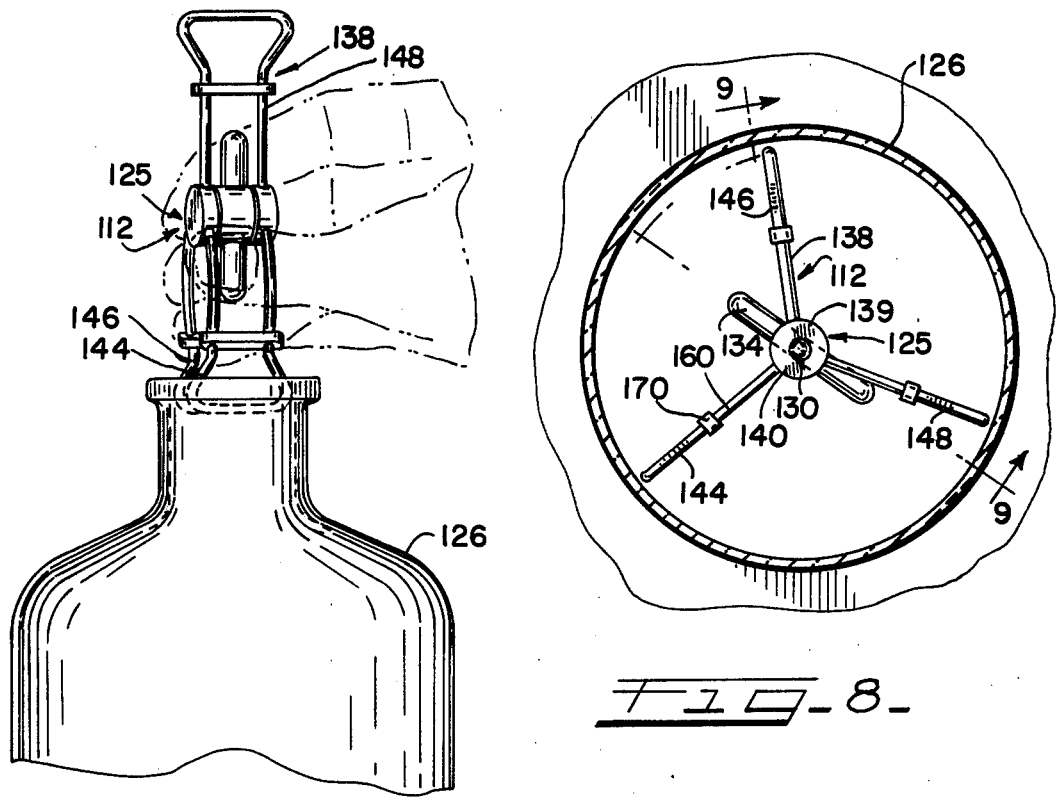
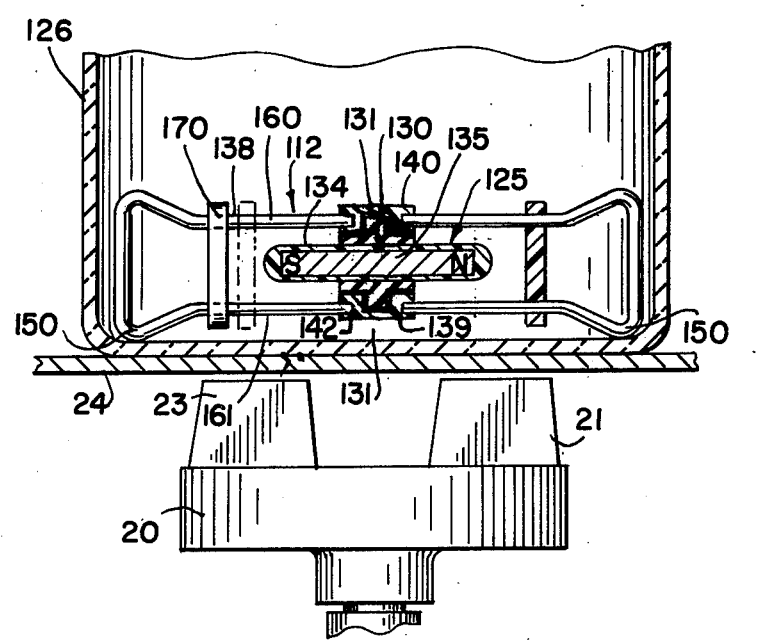
Fig. 8.
Fig. 10.
Fig. 9.

MAGNETIC STIRRER APPARATUS

BACKGROUND OF THE INVENTION

This application is a continuation-in-part of U.S. Ser. No. 622,013, now abandoned, filed Oct. 10, 1975 by Charles E. Bender for "MAGNETIC STIRRER APPARATUS". Said application Ser. No. 622,013 is a continuation-in-part of U.S. application Ser. No. 524,788, now abandoned, filed by said inventor on Nov. 18, 1974. This invention relates to agitating devices and, in particular, to a magnetically driven stirrer.

Magnetically driven agitators have been commonly used in clinical, laboratory and research work for some time. Examples of such units are shown in U.S. Pat. Nos. 3,580,812 to Bender et al issued May 25, 1971; 3,764,836 to Bender et al, issued Oct. 9, 1973; and 3,649,465 to Scharf et al, issued Mar. 14, 1972. Such devices include a magnetic driving unit usually having a motor which rotates horse shoe type magnets about an axis located between the magnetic poles, and a driven unit having one or more magnets mounted on axis fixed within a vessel containing the fluid or substance to be agitated. The magnetically driven unit is usually mounted on an axis fixed in or on the cover of the vessel and is magnetically coupled to the driving unit and rotates therewith to agitate the sample, culture or fluid within the vessel. While such magnetic agitators are significant in reducing contamination because of their completely internal support of the driven impeller they are large and bulky and present problems of cleaning and sterilization. In addition, the large size of such agitators and frictional forces developed during agitation have prevented the use of such devices where extremely low stirring speeds are required.

Moreover, where magnetic stirrers have been mounted in independent frame assemblies, as shown in U.S. Pat. No. 2,859,020 to Eddy et al, such frames are complex and expensive or cannot be used with narrow mouth vessels.

For these reasons, most magnetic agitators are not completely satisfactory for laboratory work, and have been found to be unfeasible, despite experimentation, for use in household blenders and other commercial items.

SUMMARY OF THE INVENTION

The present invention involves a small, extremely compact and lightweight stirrer or agitator for use with magnetic drive units. The size and construction of this invention presents a low cost, easy to clean and maintain stirrer which permits the use of stirring speeds significantly lower than those previously attainable and opens the door to uses of magnetic stirrers in commercial markets.

The present invention includes a magnetic rotor having a central hub which is preferably formed of or has a surface formed or covered with an inherently high lubricity material, and on which is mounted a radially extending magnetic impeller. This magnetic rotor is mounted in a central collar portion of a positioning cage which has a number of frame members extending outwardly from the collar which are designed to prevent the rotating impeller from engaging the walls of the vessel containing the substance to be stirred. The positioning cage, particularly the central collar portion, is likewise formed of or has a surface coating formed from an inherently high lubricity material. As the outward members maintain the cage in position within the vessel, the magnetic rotor is allowed to "float" relative to the cage and rotate freely, with extremely low frictional forces, relative to the vessel to agitate the substance therein. Where the cage is formed of a flexible plastic material itself, the flexibility of such material will allow insertion of the apparatus into narrow-mouth vessels.

This unique stirrer apparatus may also be formed so that the hub of the rotor has a passageway formed vertically therethrough to permit a sparging apparatus, including a generally vertical supply tube, for fluid intake or withdrawal, to be inserted through the passageway toward the bottom of the vessel to open into a plurality of radially extending outlet tubes.

Accordingly, it is the object of this invention to provide a new and improved magnetic stirrer apparatus.

It is further an object of this invention to provide a magnetic stirrer apparatus which is light in weight, portable, easy to clean and adaptable for use with known types of magnetic drives.

It is also an object of this invention to provide a magnetic stirrer apparatus which achieves high or extremely low stirring speeds without spinning out and with a reduced rate of cell grinding.

It is still another object of the present invention to provide a stirrer apparatus which is self-positioning within a vessel and does not require means within the vessel for its mounting.

It is one more object to the present invention to provide a stirrer apparatus having a magnetic rotor with high lubricity surfaces, mounted within and rotatable relative to a positioning cage, likewise having high lubricity surfaces to allow agitation of substances at a selected speed.

It is another object of the present invention to provide a stirrer apparatus having a positioning cage which supports a rotor assembly and which is sufficiently flexible to allow its insertion into narrow-mouth vessels.

It is still another object of the present objection to provide a magnetic stirrer in which the cage or legs can be totally removeable from the hub and completely dismantled, and the magnet itself may be totally removed from everything else so that it can be dropped into the neck of the bottle and used as a magnetic stirrer by itself.

Further objects of the present invention will become apparent upon consideration of the detailed description made in conjunction with the accompanying drawings wherein:

FIG. 1 is a reduced, front elevational view of a complete magnetic stirring unit, including the stirrer apparatus of the present invention and partially cut away to show the magnetic drive;

FIG. 2 is a horizontal cross sectional view of the unit of FIG. 1 taken generally along line 2—2 thereof and showing the stirrer apparatus of the present invention;

FIG. 3 is a vertical cross sectional view of the unit of FIG. 1 showing the stirrer apparatus of this invention;

FIG. 4 is a perspective view of the embodiment of the stirrer apparatus of the present invention shown in FIG. 1 alone;

FIG. 5 is a horizontal cross sectional view of a slightly modified embodiment showing the stirrer apparatus of the present invention, as shown in the unit in FIG. 6;

FIG. 6 is a partial vertical cross sectional view of a magnetic stirring unit showing a slightly modified embodiment of the stirrer apparatus of the present invention;

FIG. 7 is a perspective view of the embodiment of the stirrer apparatus shown in FIG. 6, alone;

FIG. 8 is a top plan view of a further embodiment of the magnetic stirrer apparatus of the present invention;

FIG. 9 is a vertical cross-sectional view of the stirrer apparartus shown in FIG. 8, taken generally along line 9—9 thereof;

FIG. 10 is a perspective view of the stirrer apparatus shown in FIG. 8 being inserted into a narrow-mouth vessel;

DESCRIPTION OF THE INVENTION

Figure 11:
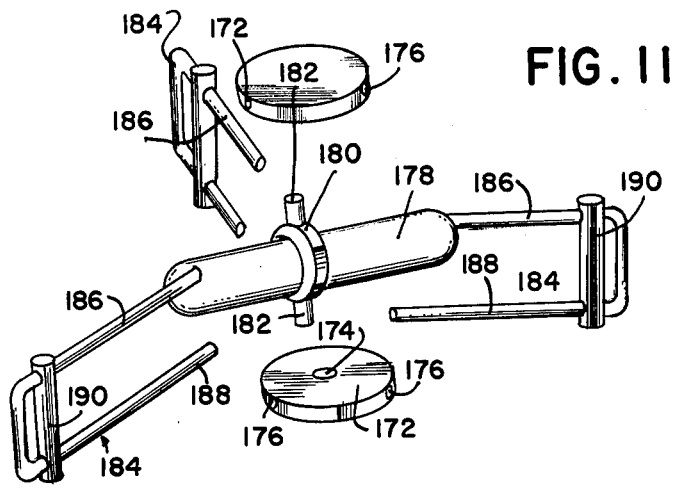
FIG. 11 is an exploded view of another embodiment of the present invention.

Referring now to the drawings, and, in particular, to FIG. 1, an entire magnetic stirring unit is shown generally at 10. This unit 10 includes the stirrer apparatus 12 of the present invention, shown positioned for agitating any fluid or substance contained within the flask or vessel 26. The magnetic drive 16 is of known design, such as described in the above-identified patents to Bender et al, and is easily commercially available. This drive 16 could include permanent or portable magnetic drive arrangements, and for household use, could be built into the top of the range and be of an electromagnetic nature. The drive 16, as shown, includes a motor 18 which is connected by suitable mechanical means to a horseshoe shaped magnet 20, having a pair of upwardly facing, opposite poles 21 and 23. The speed at which the horseshoe magnet 20 rotates about its axis is controlled by speed control 22, on the front of the unit 16. The magnetic drive unit 16 includes a top surface 24 on which the vessel containing the fluid being agitated is placed.

The flask or vessel 26 can be any conventional spinner flask, fermenter, beaker, Erlenmeyer flask or household blending container, made of glass, plastic, or similar suitable material which is used to contain a liquid, sample, culture or the like. In the preferred embodiment of this invention, as shown in the drawings, vessel 26 includes a bottom 29 and a continuous interior wall 27, which is formed with a series of spaced, vertically elongated inwardly extending flutes or projections 28, which act as stops to engage an outer portion of the stirrer apparatus 12 to prevent the stirrer apparatus 12 from "walking", as will be explained below.

This unique stirrer apparatus 12 of the present invention in the embodiment shown in FIGS. 1-4, includes a magnetic rotor assembly 25, having an impeller 34 formed from a bar magnet 35, covered with a coating 36 of an inherently high lubricity material such as a polymerized tetrafluoroethylene sold under the trademark "TEFLON" by E. I. DuPont Company of Wilmington, Del., or a suitable fluorocarbon. Such materials have a built-in natural lubricity which reduces friction and assures free running of any engaging parts, and are also inert to prevent adverse chemical reactions. This impeller 34 is inserted through a central, generally horizontal, passageway formed in a generally cylindrical hub 30. The hub 30 is formed of a similar high lubricity material and receives the impeller in close fit engagement which permits manual removal of the impeller 34 but does not allow its movement during rotation.

The hub 30 and impeller 34 forming the rotor assembly are mounted within a positioning cage means 38. In the embodiment shown in FIGS. 1-4, the positioning cage means 38 includes a central collar portion 39, having an upper collar 40 above a lower collar 42. Collars 40 and 42 are connected by angularly spaced first outward member 44, second outward member 46, and a third outward member 48. The members are wires of generally U-shaped configuration whose opposite ends are welded to or formed with the collars 40 and 42. These outward members extend radially from central collar portion 39 toward the interior wall 27 of vessel 26, and are preferably pitched slightly downwardly to assure that central collar portion 39 and the bottom of hub 30 will be spaced from the bottom of flask 26 to eliminate friction therebetween.

The hub 30 of rotor assembly 25 has an exterior diameter slightly less than the interior diameter of collars 40 and 42, and is slightly larger than the distance between these collars, so that the hub 30 and impeller 34 may be mounted within the positioning cage in the manner shown in the drawings. This mounting and the high lubricity surfaces allow the rotor assembly to "float" relative to the cage. The impeller 34 is also lesser in diameter or thickness than the distance between collars 40 and 42 so that it may rotate freely within the positioning cage 38. While collars 40 and 42 form spaced, rigid O-rings in which hub 30 is allowed to "float" vertically and rotate, this central mounting portion could also be formed by an H-ring configuration coated with TEFLON. The overall diameter of the positioning means 38, as shown in FIG. 4, may be slightly less than the interior diameter of the vessel so that the magnetic stirrer apparatus 12 may be placed within and at the bottom of the vessel. In the embodiment shown in FIGS. 1-4, the outer ends of members 44, 46 and 48 of the positioning cage 38 will engage the inwardly extending flutes 28, to prevent movement of the cage during rotation of the rotor assembly and to position the rotor in the approximate center of the vessel to achieve the best possible agitation. On the other hand, if movement of the stirrer apparatus will not create problems, it is not necessary that members 44, 46 and 48 engage the vessel walls, since they will, in any event, extend beyond the impeller to prevent its contacting the walls.

The entire cage positioning means 38, but especially the interior surfaces of the central collar portion, which comes into engaging contact with the hub 30 of the rotor assembly, are preferably either coated with the high lubricity material mentioned above, or have their surfaces formed from the same, so that rotation of the impeller is accomplished with as little frictional resisting force as possible. In actual experiments with the present invention in very viscous liquids, such as mushroom soup, it has been found that the magnetic couple could be maintained and agitation or spinning of the liquid could still be achieved at speeds as low as five to ten revolutions per minute. The previous slowest speeds attainable with prior magnetic devices was of the nature of 80 revolutions per minute. Use of this invention also allows the contents of the vessel to be heated at the same time agitation by the stirrer apparatus is occurring which cannot be accomplished by present mechanical devices.

A second, slightly modified embodiment of this invention is shown in FIGS. 5-7, and contains many elements identical with or similar to those described above which are denoted by prime numerals. In this embodiment, however, the positioning cage 38' has parallel spaced peripheral upper and lower-supporting wires 60 and 61, respectively, which are connected by vertical braces 58 at selected points. Peripheral wires 60 and 61 are attached to collars 40' and 42' by radial support braces 56. Peripheral wires 60 and 61 are formed with corresponding upper and lower indentations 70 which are similar in configuration to and slightly larger in radius than the inwardly extending flutes 48, formed in the walls 27 of vessel 26. Thus, the stirrer apparatus 12' shown in this second embodiment of the invention may be always positively positioned within the vessel as shown in FIG. 5.

Rotor assembly 25' includes hub 30, which supports two separate impellers 62 and 62' disposed with their opposite magnetic poles adjacent and mounted in holes 72 formed in opposite sides of hub 30'.

The use of separate magnetic impellers 62 and 62' in this embodiment allows use of a sparger system 64 for introducing fluids, such as air, or withdrawing fluids from the culture, sample, liquid or substance during agitation. System 64 includes a vertical primary supply tube 66, which extends downwardly into the vessel. Tube 66 passes through a passageway 54 formed generally along the vertical axis of the hub 30'. The lower end of the supply tube 66 opens into an arrangement of horizontally disposed outlet tubes 68 which direct the air or fluid toward the outer walls of the vessel for better mixing.

FIGS. 8 through 10 illustrate a third, slightly modified embodiment of the present invention which has broadened commercial uses. In this embodiment, the magnetic stirrer assembly, shown at 112, includes a rotor assembly 125, having an impeller 134 formed from a bar magnet 135 covered with a coating of high lubricity material, as described above. Impeller 134 is mounted in a generally cylindrical hub 130 having reduced diameter end portions 131, which serve as mounting axles. Hub 130 is received within a central collar portion 139 of a positioning cage or frame 138 by mounting end portions 131 within correspondingly shaped recesses formed in parallel, spaced upper and lower collars or center caps 140 and 142. The interior contacting surfaces of such caps 140 and 142 and hub 130 are coated with a high lubricity material to reduce friction. The hub contacting, closed ends of caps 140 and 142 serve to maintain impeller 134 spaced between them and within the positioning cage.

Collars 140 and 142 are, as in the first embodiment above described, connected by angularly spaced generally U-shape outward members. Three such members 144, 146 and 148 are shown in FIG. 8, although four or more members could be used if desired. These outward members are formed from a flexible, resilient material such as TEFLON rod or from a resilient metal covered with a high lubricity coating and their corresponding free ends are joined to collars 140 and 142 as shown in FIG. 9. The use of a polymeric material to form outward members 144, 146 and 148 allows two adjacent such members to be pinched together, as shown in FIG. 10, so that the entire stirrer assembly 112 can be inserted into narrowmouth vessel 126. Once inside vessel 126, the legs will return to their original position to support the rotor assembly 125 above the vessel bottom for rotation. The stirrer assembly 112 is easily retrieved from the vessel by using any suitable long handled hook which can engage one of the U-shaped outward members and pull the stirrer assembly through the bottle mouth.

Each of the outward members preferably has an enlarged outer end or foot 150 which supports the central portion of the stirring assembly above the vessel bottom to eliminate frictional forces therebetween.

In very large vessels, such as 8 liter bottles, where it is desirable to have a larger stirring assembly, (e.g., 6.5 inches in diameter 1.5 1.5 inches in height) it is also preferable that the parallel horizontal legs 160 and 161 of the outward members be connected, for support, by a vertical brace 170 which may be slideably positioned along each of the members to resist vertical stresses and maintain the flexible legs in essentially parallel relationship.

In the operation of this invention in any of the embodiments described, the stirrer apparatus 12 is first placed within the vessel. The magnetic drive 16 is then activated so that the horseshoe magent 20 is rotated. The south pole 21 of the magnet 20 will align with the outward north pole of the magnetic impeller and the north pole 23 will align with the outward south pole of the impeller forming a strong magnetic couple therebetween such that the impeller rotates with little frictional drag at the same speed as magnet 20 and agitates the substances in the vessel. In embodiments wherein the vessel is formed with positioning flutes in its walls, the cage will, upon rotation of the impeller, engage such flutes to prevent walking of the stirrer. The rotor assemblies and positioning cages shown in the drawings are easily interchangeable with one another. It is also clear that, if desired, the hub 30 could be extended upwardly and support a second, stationary, elongated impeller parallel to impeller 34 for rotation therewith. This second impeller need not be made magnetic since the single lower magnetic impeller would be sufficient for rotation of the entire rotor assembly.

Figure 12:
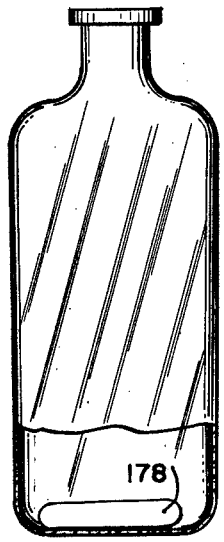
FIG. 12 is a view of the magnet shown in FIG. 11 being utilized by itself in a narrow-necked bottle.
Figure 13:
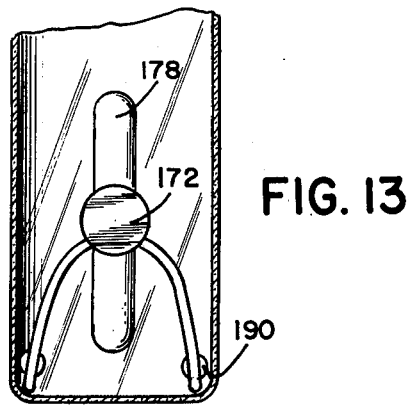
FIG. 13 is a view of the magnetic stirrer of FIG. 11 being used in a narrow bottle with the magnet rotating in a vertical direction.

In the embodiment of the invention shown in FIGS. 11 to 13, the hub assembly consists of two circular flat discs 172, as best seen in FIG. 11. The discs are provided with a central bore 174, one of which can be seen in FIG. 11. The size or periphery of the disc are provided with equally spaced bores 176, preferably three. The impeller or magnet 178 extends through a circular ring 180 which can be slidably away from the magnet. The ring 180 is provided with two dowels 182 press fitted into complementary bores therein. The dowels 182 extend into the openings 174 when the magnetic stirrer is assembled.

Three U-shaped legs 184 are provided with the upper leg 186 being adapted to extend into the bores 172 and the top disc while the lower legs 188 are adapted to be removably inserted in the bore 176 of the lower disc. The outer ends of the U-shaped legs are provided with cylindrical members 190 adjacent to outer edges. The legs 184 are preferably made Tefcel which is harder than Teflon and commonly used in autoclaves, although, of course, they could be made of other plastic material having flexibility.

The U-shaped legs 184 which in effect form a cage for the rotating magnet 178 which operates in the same manner as those heretofore described, except that this magnetic stirrer, as best seen in FIG. 13 can be used in a vertical direction in which your magnet 178 can have one leg or portion of the cage removed so that the magnet rotates in a vertical direction. This is very suitable for narrow flasks or bottles. Further, more, the detachable elements of the embodiment shown in FIG. 11 can be completely dismantled as shown in the exploded drawing therein and thus used in any particular situation. Also, the provision of the detachable parts permits the magnet and discs 172 to be used with U-shaped legs 184 or cages to vary the dimensions depending on the size of the flask it is desired to use the apparatus with.

Referring to FIG. 12, it is to be noted that the rotatable magnet 178 which, of course, is driven by the driving magnetic means heretofore described, permits the magnet to be used per se, or by itself in a very narrow-necked bottle and consequently, offers a wide variety of use in any stirring or mixing arrangement of medicinal, laboratory or whatever type of operation is necessary.

It is also noted that the positioning cage may be formed in various configurations to perform its intended function. For example, for use in a household blender, the cage could be constructed with as many as four outwardly extending members of such length that each could be placed into the corners of a conventional rectangular blending vessel. These outward members could conceivably also be formed of a resilient material or with a spring loaded attachment so that they might be sprung into position within such a vessel. Where slight "walking" of the stirrer apparatus during rotation does not pose a problem, this stirrer is equally useful in any diameter flask or vessel since the positioning cage will always prevent contact between the impeller and the vessel walls even though the outward members may not constantly engage the vessel walls. These outward members will also serve to position the rotor assembly generally near the center of the vessel for more effective stirring.

The materials suitable for use in the magnet include any well known, permanent magnetic material such as alnico. The strength of the magnetic field and the couple may be increased by placing a soft metal material on opposite sides of the magnet.

In addition to fulfilling the requirements of laboratories which need extremely low and/or high speed stirring without the problem of spinouts and with a reduced rate of cell-grinding and household uses requiring controlled high and low speed stirring in viscous liquids, the present invention also eliminates continuous and costly replacement of present magnetic bars which are often washed down the drain when the vessel is cleaned. This invention, with its unique positioning cage, simply cannot be lost in this manner.

While this invention has been shown as positioned on the bottom of a flask or vessel, it could also be mounted in a recess formed in a side wall of an ultra-filter or similar apparatus to agitate fluid in the manner described above. Moreover, though the embodiment shown in FIGS. 1–5 illustrates the positioning cage having three relatively rigid, equiangularly spaced, outwardly radially extending members, it is contemplated that two of such members could have their outer ends spaced sufficiently close together to allow the stirrer apparatus to be inserted through the opening and neck of a narrow mouth flask or bottle while supporting the magnetic impeller above the walls of such flask when positioned within such flask. That is, the ends of two of the outward members are separated a distance less than or equal to the diameter of the bottle mouth and the third member is positioned opposite them. Such spacing modification would, of course, be unnecessary where the embodiment having the flexible members, as shown in FIGS. 8–10, is used.

Thus, the embodiment of the invention illustrated and described in FIGS. 11 to 13 provides a novel dismantable, and magnetic stirrer apparatus in which the legs can be totally adjustable in dimension and removable so that the apparatus can be made of any size for smaller beakers, larger beakers or flasks, and further in which the magnet can be used per se in which it can be slipped into the neck which is too small for the rest of the apparatus to overcome the specific dimensional sizes encountered heretofore.

Upon consideration of the foregoing, it will become obvious to those skilled in the art that various modifications may be made without departing from the invention embodied herein. Therefore, only such limitations should be imposed as are indicated by the spirit and scope of the appended claims.

What is claimed is:

1. A stirrer apparatus particularly adapted for magnetic coupling to a magnetic drive to agitate a substance, such as a fluid, culture, sample or the like contained in a vessel when moved by the magnetic drive, including stirrer positioning means disposed within said vessel containing said substance to be agitated and independent therefrom, said stirrer positioning means including a positioning cage having a central mounting portion and a vessel engaging portion of substantially fixed vertical and horizontal dimensions extending radially outwardly therefrom, rotor assembly means rotatably mounted on said stirrer positioning means and being supported thereby within said vessel, generally parallel to an interior surface thereof and to said magnetic drive, said rotor assembly means being magnetically coupled to and magnetically rotatable by said magnetic drive at a desired speed relative to said vessel, said radially outwardly extending vessel engaging portion of said positioning cage extends beyond said rotor assembly means, and said rotor assembly means includes hub means formed for mounting within said central mounting portion of said positioning cage, said hub means being freely movably relative thereto, and magnetic impeller means mounted on said hub means for rotation therewith relative to said vessel, said hub means including spaced upper and lower collar members with said cage comprising an open substantially flat and horizontal wire means to provide said cage, said hub means having a generally vertical passageway formed therein along an axis of rotation of said hub means, said passageway being capable of receiving fluid supply means therethrough, a portion of said fluid supply means being disposed below said hub means for introducing or drawing fluid from said vessel.

2. A stirrer apparatus particularly adapted for magnetic coupling to a magnetic drive to agitate a substance such as a fluid, culture, sample or the like contained in a vessel when moved by the magnetic drive, including stirrer positioning means disposed within said vessel containing said substance to be agitated and independent therefrom, said stirrer positioning means including a positioning cage having a central mounting portion and a vessel engaging portion of substantially fixed vertical and horizontal dimensions extending radially outwardly therefrom, rotor assembly means rotatably mounted on said stirrer positioning means and being supported thereby within said vessel, generally parallel to an interior surface thereof and to said magnetic drive, said rotor assembly means being magnetically coupled to and magnetically rotatable by said magnetic drive at a desired speed relative to said vessel to thereby agitate said substance in said vessel, said radially outwardly extending vessel engaging portion of said positioning cage extending beyond said rotor assembly means, said rotor assembly means including hub means formed for mounting within said central mounting portion of said positioning cage, said hub means being freely movable relative thereto, and magentic impeller means mounted on said hub means for rotation therewith relative to said vessel, said hub means having generally vertical passageway formed therein along an axis of rotation of said hub means, said passageway being capable of receiving fluid supply means therethrough, a portion of said fluid supply means being disposed below said hub means for introducing or drawing fluid from said vessel.

* * * * *